United States Patent [19]

Kuratani et al.

[11] Patent Number: 4,843,038
[45] Date of Patent: Jun. 27, 1989

[54] BLACK SINTERED BODY OF ALUMINUM NITRIDE AND PROCESS FOR PRODUCING THE SAME

[75] Inventors: Shusei Kuratani; Kohichi Uno, both of Nagoya; Shinya Mizuno, Seto; Hisashi Sakuramoto; Satoshi Nishiyama, both of Nagoya, all of Japan

[73] Assignee: Narumi China Corporation, Nagoya, Japan

[21] Appl. No.: 118,192

[22] Filed: Nov. 6, 1987

[30] Foreign Application Priority Data

Nov. 13, 1986 [JP] Japan .................................. 61-270390
Mar. 28, 1987 [JP] Japan .................................. 62-75620
Jul. 11, 1987 [JP] Japan .................................. 62-173279

[51] Int. Cl.$^4$ ............................................. C04B 35/58
[52] U.S. Cl. ......................................... 501/98; 501/96
[58] Field of Search .................................... 501/96, 98

[56] References Cited

U.S. PATENT DOCUMENTS

| | | | |
|---|---|---|---|
| 3,108,887 | 10/1963 | Lenie et al. | 501/98 |
| 4,435,513 | 3/1984 | Komeya et al. | 501/98 |
| 4,540,673 | 9/1985 | Takeda et al. | 501/96 |
| 4,578,232 | 3/1986 | Huseby et al. | 501/98 |
| 4,627,815 | 12/1986 | Aldinger et al. | 501/96 |

FOREIGN PATENT DOCUMENTS

| | | | |
|---|---|---|---|
| 0207465 | 7/1987 | European Pat. Off. | |
| 3337630 | 4/1985 | Fed. Rep. of Germany | 501/98 |
| 59-207882 | 11/1984 | Japan | 501/96 |
| 60-71575 | 4/1985 | Japan | |
| 61-270263 | 11/1986 | Japan | |
| 62-153173 | 7/1987 | Japan | |

*Primary Examiner*—William R. Dixon, Jr.
*Assistant Examiner*—Anthony J. Green
*Attorney, Agent, or Firm*—Flynn, Thiel, Boutell & Tanis

[57] ABSTRACT

Black sintered bodies of aluminum nitride are produced by adding a sintering aid selected from the group consisting of (a) an oxide mixture of calcium oxide and at least one of tungsten oxide and molybdenum oxide, (b) an oxide containing calcium and at least one of tungsten and molybdenum and (c) a mixture of compounds capable of being converted into said oxide mixture (a) or said oxide (b) by sintering to aluminum nitride so that the resulting composition consists essentially of 0.1 to 20 wt. % in the total amount (calculated as oxides of Ca, W and Mo) of the sintering aid and balance aluminum nitride, molding the composition and sintering the molded composition at relatively low temperature. The black sintered bodies thus obtained are especially useful as materials for insulating substrate, heat sink and packaging for semiconductor device due to their high density, good thermal conductivity and superior light-shielding ability.

11 Claims, No Drawings

BLACK SINTERED BODY OF ALUMINUM NITRIDE AND PROCESS FOR PRODUCING THE SAME

BACKGROUND OF THE INVENTION

1. Field of the Invention

The present invention relates to black sintered bodies of aluminum nitride used as materials for insulating substrates, heat sinks, packages for semiconductor devices and a process for producing the same. More specifically, the present invention relates to sintered bodies of aluminum nitride having a high density and a good thermal conductivity and to a process for the production thereof at reduced sintering temperatures.

2. Description of the Prior Art

In recent years, with an increasing trend toward the high integration and high densification of LSI, there has been a great demand for insulating substrate materials having a good thermal conductivity. Heretofore, alumina sintered articles have been most widely used as a material for an insulating substrate. However, since the alumina substrate has a low thermal conductivity (about 20 W/m.K) and has a large thermal expansion coefficient as compared to silicon, it has many problems such as poor bondability, etc. Therefore, sintered bodies of aluminum nitride (AlN) which have a good thermal conductivity and a desirable thermal expansion coefficient approaching that of silicon have attracted a great interest. In addition to these advantages, the aluminum nitride sintered bodies possess a high mechanical strength (40–50 kg/mm$^2$) and good electrical properties, for example, a small dielectric constant.

However, since aluminum nitride materials are poor in sinterability due to their typically covalent bond, it is difficult to obtain high density sintered bodies. For this reason, various ways of achieving high density sintered bodies of aluminum nitride have been tried to date and, for example, there may be mentioned the addition of a sintering aid and the use of hot pressing. As the sintering aid, a rare earth oxide or alkali earth oxide is added to aluminum nitride powder and the resulting mixture is sintered in a nonoxidizing atmosphere at atmospheric pressure or by using a hot pressing process. The resulting sintered bodies of aluminum nitride exhibit a relatively high density but are insufficient in thermal conductivity. Further, the known aluminum nitride composition requires a very high sintering temperature, i.e., at least 1800° C., and results in an increased production cost.

On the other hand, there has been recently obtained highly pure aluminum nitride powder. As an example, in Japanese patent application laid-open No. 60-71 575, transparent sintered bodies of aluminum nitride are produced at atmospheric pressure or using a hot pressing process. However, in the production of such transparent sintered bodies, uneven sintering and uneven coloring problems are apt to arise, and, in some cases, color change occurs in the resulting sintered bodies, for example, by sunlight (ultraviolet rays). When such sintered bodies are used as a packaging substrate, an IC memory mounted inside will be detrimentally affected.

SUMMARY OF THE INVENTION

Therefore, an object of the present invention is to provide a black sintered body of aluminum nitride having a high density, a good thermal conductivity and an excellent light-shielding property.

Another object of the present invention is to provide a process for producing such a black sintered body of aluminum nitride by sintering at relatively low temperatures.

According to the present invention, there is provided a black sintered body of aluminum nitride which is produced by adding a sintering aid selected from the group consisting of (a) an oxide mixture of calcium oxide and at least one of tungsten oxide and molybdenum oxide, (b) an oxide containing calcium and at least one of tungsten and molybdenum or (c) a mixture of compounds (precursors) capable of being converted into the foregoing oxide mixture (a) or the oxide (b) by sintering to aluminum nitride so that the resulting composition consists essentially of 0.1 to 20 wt. % (in the total amount calculated as oxides of Ca, W and Mo) of the sintering aid and balance aluminum nitride, molding the composition and sintering the molded composition. Sintering is conducted in a nonoxidizing atmosphere, such as nitrogen gas, argon gas, helium gas, carbon monoxide gas, hydrogen gas, ammonia gas or a mixed gas thereof or in a vacuum.

DETAILED DESCRIPTION OF THE PREFERRED EMBODIMENT

The present invention will be now described in detail hereinunder.

Firstly, aluminum nitride powder used in the present invention preferably has an average particle diameter of not more than 10 μm and more preferably not more than 2 μm.

Calcium (Ca) used as the sintering aid in combination with tungsten (W) and/or molybdenum (Mo) may be added in the form of oxide with or without W and/or Mo or in the form of compound which can be eventually converted to the oxide form by sintering to the aluminum nitride. For example, there may be mentioned CaO, $CaWO_4$, $Ca_3WO_6$ and $CaMoO_4$, as the oxide form and $CaCO_3$, $Ca(NO_3)_2 \cdot 4H_2O$ and $CaC_2O_4 \cdot H_2O$ may be used as the compounds capable of being converted into the calcium oxides by sintering.

Examples of the oxides of W and Mo or compounds capable of being converted into the oxides by sintering include $WO_3$, $H_2WO_4$, $MoO_3$, $H_2MoO_4$, etc.

The oxides set forth above as the sintering aid or their precursors are preferably added in the form of small powder having an average particle diameter of not more than 10 μm, preferably not more than 5 μm. The sintering aid is preferably added in the total amount of 0.1 to 20 wt. %, more preferably 1 to 15 wt. %, calculated as oxides of Ca, W and Mo, based on the total weight of aluminum nitride and the sintering aid as the oxides. In other words, when the sintering aid is added in the oxide form, such as CaO, $WO_3$, $MoO_3$ $CaWO_4$ or $Ca_3WO_6$, its amount is calculated as the oxide form added. However, when the precursors of the oxides of Ca, W and Mo are used, the amounts are calculated as the oxide form given after sintering. Such calculation is also applied to Examples and Comparative Examples hereinafter described. Addition of less than 0.1 wt. % can not provide high density sintered bodies and the resulting sintered bodies are gray in color. On the other hand, an addition exceeding 20 wt. % leads to a considerable crystal growth and results in lowering of the density, mechanical strength and thermal conductivity. Therefore, such excess addition is unfavorable.

In accordance with the present invention, the sintered body of aluminum nitride is produced as follows.

Firstly, the sintering aid as mentioned above is added to aluminum nitride powder and uniformly mixed using a ball mill to provide a powdered mixture having the composition specified above. Thereafter, in accordance to the conventional manner, about 5 to 7 parts by weight of a suitable organic binder, such as paraffin or polyvinyl alcohol is added to 100 parts by weight of the powdered mixture and intimately mixed together. The mixture is then subjected to granulation and grading steps and molded by using a metal mold, hydrostatic pressing or sheet forming process. Subsequently, the resulting molded body is heated at about 500° C. in a nitrogen gas stream to remove the binder. These steps are almost the same as the conventional procedure, and, thus, descriptions concerning to them are simplified or omitted in the following Examples and Comparative Examples.

The thus treated bodies are further subjected to sintering process in a furnace. The sintering should be performed in a nonoxidizing atmosphere, for example, in an atmosphere of nitrogen gas, argon gas, helium gas, carbon monoxide gas, hydrogen gas, ammonia gas or a mixed gas thereof or in a vacuum. Particularly, an atmosphere of nitrogen gas is preferable. Sintering temperature is generally in the range of 1500° to 2100° C. and may preferably be in the range of 1550° to 1800° C. Sintering is ordinarily conducted at atmospheric pressure but it can be also conducted under reduced pressure or by hot-press sintering.

The present invention will now be described in detail with reference to Examples and Comparative Examples. Unless otherwise indicated, the amounts of sintering aids used in Examples and Comparative Examples are all given in wt. % (calculated as oxides of Ca, W and Mo, as previously specified) on the basis of the total weight of the oxides and aluminum nitride.

EXAMPLE 1

3.9 wt. % of calcium tungstate ($CaWO_4$) powder was added to aluminum nitride powder having an average particle diameter of 2 μm and mixed together. Then, the resulting mixture was molded under a pressure of about 1200 kg/cm$^2$ at room temperature and sintered at a temperature of 1600° C. for three hours in an atmosphere of nitrogen gas to provide a sintered body of aluminum nitride. The sintered body thus obtained was dense and had light-shielding ability and an intense black color. The density and the thermal conductivity of the sintered body were measured and the results are given in Table 1 below.

EXAMPLES 2 TO 11

Further sintered bodies of aluminum nitride were obtained in the same manner as described in Example 1 except that calcium tungstate ($CaWO_4$) powder and/or calcium molybdate ($CaMoO_4$) powder were added in the amounts shown in Table 1 to the aluminum nitride powder used in Example 1 and sintering was conducted at temperatures of 1600° to 1800° C. Density and thermal conductivity were measured for the respective sintered bodies. The results obtained are shown in Table 1, together with the kind and the amounts of the used sintering aids, the sintering conditions and the color of the respective sintered bodies.

EXAMPLE 12

3.9 wt. % calcium tungstate ($CaWO_4$) powder and 2.8 wt. % of calcium molybdate ($CaMoO_4$) powder were added to aluminum nitride powder having an average particle diameter of 2 μm and mixed. Then, the resulting mixture was molded under a pressure of about 1200 kg/cm$^2$ at room temperature. Thereafter, the molded body was sintered at 1550° C. for 3 hours in a nitrogen gas atmosphere and a sintered body of aluminum nitride was obtained. The resulting sintered body was dense, had an excellent ability to shield light and showed an intense black color. The density and the thermal conductivity of the sintered body were measured and the results are given in Table 1.

EXAMPLES 13 TO 21

Further sintered bodies of aluminum nitride were obtained in the same manner as described in Example 12 except that calcium tungstate ($CaWO_4$) powder and calcium molybdate ($CaMoO_4$) powder were added in the amounts shown in Table 1 to the aluminum nitride powder used in Example 12 and sintering was conducted at temperatures of 1600° to 1800° C. Density and thermal conductivity were measured for the respective sintered bodies. The results obtained are shown in Table 1, together with the kind and the amounts of the used sintering aids, the sintering conditions and the color of the respective sintered bodies.

X-ray diffraction studies showed that all of the sintered bodies obtained in Examples 1 to 21 include, in addition to an AlN phase, calcium aluminate compound, metallic tungsten and/or metallic molybdenum and compounds of tungsten and/or molybdenum, such as $W_2C$, $W_2B$, etc., as main constitutional phases. Further, it has been found that the black color of the sintered bodies was due to finely dispersed metallic tungsten and/or metallic molybdenum. The sintered body exhibited good electrical insulating properties (volume resistivity of at least $10^{13}$ ohm·cm).

TABLE 1

| Ex. No. | Sintering aid $CaWO_4$ wt. % | Sintering aid $CaMoO_4$ wt. % | Total amount wt. % | Sintering conditions Sintering temperature °C. | Sintering time Hr. | Color | Density g/cc | Thermal conductivity w/m·K |
|---|---|---|---|---|---|---|---|---|
| 1 | 3.9 | — | 3.9 | 1600 | 3 | Black | 3.23 | 96 |
| 2 | 6.2 | — | 6.2 | 1600 | 3 | Black | 3.32 | 94 |
| 3 | 11.2 | — | 11.2 | 1600 | 3 | Black | 3.36 | 91 |
| 4 | 1.4 | — | 1.4 | 1700 | 3 | Black | 3.27 | 97 |
| 5 | 3.9 | — | 3.9 | 1700 | 3 | Black | 3.30 | 100 |
| 6 | 6.2 | — | 6.2 | 1700 | 3 | Black | 3.33 | 99 |
| 7 | 1.4 | — | 1.4 | 1800 | 3 | Black | 3.27 | 90 |
| 8 | 3.9 | — | 3.9 | 1800 | 3 | Black | 3.30 | 103 |
| 9 | 6.2 | — | 6.2 | 1800 | 3 | Black | 3.34 | 103 |
| 10 | — | 2.8 | 2.8 | 1700 | 3 | Black | 3.28 | 99 |

TABLE 1-continued

| Ex. No. | Sintering aid CaWO$_4$ wt. % | CaMoO$_4$ wt. % | Total amount wt. % | Sintering conditions Sintering tempera- ture °C. | Sintering time Hr. | Color | Density g/cc | Thermal conducti- vity w/m·K |
|---|---|---|---|---|---|---|---|---|
| 11 | — | 2.8 | 2.8 | 1800 | 3 | Black | 3.28 | 103 |
| 12 | 3.9 | 2.8 | 6.7 | 1550 | 3 | Black | 3.21 | 77 |
| 13 | 3.9 | 2.8 | 6.7 | 1600 | 3 | Black | 3.30 | 90 |
| 14 | 6.2 | 4.5 | 10.7 | 1600 | 3 | Black | 3.31 | 82 |
| 15 | 0.7 | 0.5 | 1.2 | 1700 | 3 | Black | 3.25 | 95 |
| 16 | 1.4 | 1.0 | 2.4 | 1700 | 3 | Black | 3.27 | 102 |
| 17 | 3.9 | 2.8 | 6.7 | 1700 | 3 | Black | 3.32 | 100 |
| 18 | 11.2 | 4.5 | 15.7 | 1700 | 3 | Black | 3.41 | 83 |
| 19 | 0.1 | 0.1 | 0.2 | 1800 | 3 | Black | 3.25 | 86 |
| 20 | 0.7 | 0.5 | 1.2 | 1800 | 3 | Black | 3.26 | 97 |
| 21 | 1.4 | 1.0 | 2.4 | 1800 | 3 | Black | 3.28 | 104 |

COMPARATIVE EXAMPLES 1

A comparative aluminum nitride sintered body was prepared in the same way as described in Example 1, except that calcium tungstate used in Example 1 was omitted and sintering was carried out at 1800° C. for 3 hours. The sintered body of aluminum nitride was white and was not fully densified.

COMPARATIVE EXAMPLE 2

1 wt. % of calcium carbonate (CaCO$_3$) powder was added to the aluminum nitride powder used in Example 1 and a sintered body of aluminum nitride was obtained in the same procedure as described in Example 1 except that sintering was performed at a temperature of 1800° C. for 3 hours. The sintered body thus obtained was gray and unevenly sintered portions were observed in the sintered body.

COMPARATIVE EXAMPLE 3

1 wt. % of yttrium oxide (Y$_2$O$_3$) powder was added to the aluminum nitride powder used in Example 1 and a sintered body of aluminum nitride was obtained in the same procedure as described in Example 1 except that sintering was performed at a temperature of 1800° C. for 3 hours. The sintered body thus obtained was light brown and showed slightly light-transmitting properties. Further, uneven sintering was observed in some portions of the sintered body.

COMPARATIVE EXAMPLE 4

1 wt. % of calcium carbonate (CaCO$_3$) powder was added to the aluminum nitride powder used in Example 1 and a sintered body of aluminum nitride was obtained in the same procedure as described in Example 1 except that sintering was performed at a temperature of 1700° C. for 3 hours. The sintered body thus obtained was light gray and was not fully densified.

COMPARATIVE EXAMPLE 5

1 wt. % of yttrium oxide (Y$_2$O$_3$) powder was added to the aluminum nitride powder used in Example 1 and a sintered body of aluminum nitride was obtained in the same procedure as described in Example 1 except that sintering was performed at a temperature of 1700° C. for 3 hours. The sintered body thus obtained was gray and was not fully densified.

Density and thermal conductivity were measured for the sintered bodies of aluminum nitride obtained in Comparative Examples 1 to 5 as in the foregoing Examples and the results obtained are given in Table 2. It is apparent that those comparative sintered bodies all have a low thermal conductivity as compared to the sintered bodies of the present invention.

TABLE 2

| Comparative Ex. No. | Sintering aid | Amount wt. % | Sintering conditions Sintering temperature °C. | Sintering time Hr. |
|---|---|---|---|---|
| 1 | — | — | 1800 | 3 |
| 2 | CaCO$_3$ | 1.0 | 1800 | 3 |
| 3 | Y$_2$O$_3$ | 1.0 | 1800 | 3 |
| 4 | CaCO$_3$ | 1.0 | 1700 | 3 |
| 5 | Y$_2$O$_3$ | 1.0 | 1700 | 3 |

| Comparative Ex. No. | Color | Density g/cc | Thermal conductivity W/m·K |
|---|---|---|---|
| 1 | White | 2.53 | 25 |
| 2 | Gray | 3.15 | 48 |
| 3 | Light brown | 3.25 | 65 |
| 4 | Light gray | 2.85 | 26 |
| 5 | Gray | 2.95 | 35 |

COMPARATIVE EXAMPLE 22

To aluminum nitride powder having an average particle diameter of 2 μm was added 0.1 wt. % of Ca$_3$WO$_6$ and mixed together. The resulting powdered mixture was molded under a pressure of about 1200 kg/cm$^2$ at room temperature. The molded body was then sintered at 1700° C. for 3 hours in an atmosphere of nitrogen gas and there was obtained an aluminum nitride sintered body. The sintered body thus obtained was dense and black and was superior in light-shielding ability and surface smoothness. The density and the thermal conductivity of the sintered body were measured and the results given in Table 3.

EXAMPLES 23 TO 36

Alternative sintered bodies of aluminum nitride were obtained according to the procedure described in Example 22 except that Ca$_3$WO$_6$ powder was added in the amounts shown in Table 3 below to the aluminum nitride powder used in Example 22 and sintering was performed at temperature of 1550° to 1700 ° C. Density and thermal conductivity were measured for the respective sintered bodies and the results obtained are given in Table 3, together with the amounts of the sintering aid (Ca$_3$WO$_6$), sintering conditions and their color.

X-ray diffraction studies showed that all of the sintered bodies obtained in Examples 22 to 36 include, in addition to an AlN phase, calcium aluminate compound, metallic tungsten and tungsten compounds, such as W$_2$C, W$_2$B, etc., as main constitutional phases. Further, it has been found that the black color of the sintered bodies was due to finely dispersed metallic tungsten. The sintered body exhibited good electrical insulating properties (volume resistivity of at least $10^{13}$ ohm·cm).

TABLE 3

| Ex. No. | Sintering aid $Ca_3WO_6$ wt. % | Sintering conditions Sintering temperature °C. | Sintering time Hr. | Color | Density g/cc | Thermal conductivity W/m·K |
|---|---|---|---|---|---|---|
| 22 | 0.1 | 1700 | 3 | Black | 3.25 | 95 |
| 23 | 1.0 | 1700 | 3 | Black | 3.26 | 98 |
| 24 | 3.0 | 1700 | 3 | Black | 3.26 | 123 |
| 25 | 5.0 | 1700 | 3 | Black | 3.27 | 124 |
| 26 | 7.0 | 1700 | 3 | Black | 3.28 | 112 |
| 27 | 10.0 | 1700 | 3 | Black | 3.30 | 109 |
| 28 | 15.0 | 1700 | 3 | Black | 3.37 | 95 |
| 29 | 1.0 | 1600 | 3 | Black | 3.11 | 77 |
| 30 | 3.0 | 1600 | 3 | Black | 3.25 | 105 |
| 31 | 5.0 | 1600 | 3 | Black | 3.18 | 99 |
| 32 | 7.0 | 1600 | 3 | Black | 3.26 | 91 |
| 33 | 10.0 | 1600 | 3 | Black | 3.21 | 83 |
| 34 | 15.0 | 1600 | 3 | Black | 3.24 | 71 |
| 35 | 3.0 | 1550 | 3 | Black | 3.07 | 84 |
| 36 | 15.0 | 1550 | 3 | Black | 3.17 | 66 |

EXAMPLE 37

Tungsten anhydride ($WO_3$) powder in an amount of 1.103 wt. % and calcium carbonate ($CaCO_3$) powder in an amount of 0.267 wt. %, calculated as CaO, were added to aluminum nitride powder having an average particle diameter of 2 μm and intimately admixed. Then, the resulting mixture was molded under a pressure of about 1200 kg/cm² at room temperature and then sintered at a temperature of 1700° C. for three hours in an atmosphere of nitrogen gas to provide a sintered body of aluminum nitride. The sintered body thus obtained was dense, had a light-shielding ability and showed an intense black color. The density and the thermal conductivity of the sintered body were measured and the results are given in Table 4 below.

EXAMPLES 38 TO 57

Further sintered bodies of aluminum nitride were obtained in the same manner as described in Example 37 except that $WO_3$ powder and $CaCO_3$ powder were added in the amounts shown in Table 4 to the aluminum nitride powder used in Example 37 and sintering was conducted at temperatures of 1550° to 1700° C. The amount of $CaCO_3$ is calculated as CaO in Table 4. Density and thermal conductivity were measured for the respective sintered bodies. The results obtained are shown in Table 4, together with the amounts of the used sintering aids, the sintering conditions and the color of the respective sintered bodies.

X-ray diffraction studies showed that all of the sintered bodies obtained in Examples 37 to 57 include, in addition to an AlN phase, calcium aluminate compound, metallic tungsten and tungsten compounds, such as $W_2C$, $W_2B$, etc., as main constitutional phases. Further, it has been found that the black color of the sintered bodies was due to finely dispersed metallic tungsten. The sintered body exhibited good electrical insulating properties (volume resistivity of at least $10^{13}$ ohm·cm).

TABLE 4

| Ex. No. | Sintering aid $WO_3$ wt. % | CaO wt. % | Total amount wt. % | Sintering conditions Sintering temperature °C. | Sintering time Hr. | Color | Density g/cc | Thermal conductivity W/m·K |
|---|---|---|---|---|---|---|---|---|
| 37 | 1.103 | 0.267 | 1.37 | 1700 | 3 | Black | 3.27 | 85 |
| 38 | 3.148 | 0.761 | 3.909 | 1700 | 3 | Black | 3.28 | 89 |
| 39 | 5.008 | 1.212 | 6.22 | 1700 | 3 | Black | 3.31 | 96 |
| 40 | 8.980 | 2.172 | 11.152 | 1700 | 3 | Black | 3.36 | 81 |
| 41 | 3.0 | 1.212 | 4.212 | 1700 | 3 | Black | 3.27 | 104 |
| 42 | 3.148 | 1.681 | 4.829 | 1700 | 3 | Black | 3.27 | 110 |
| 43 | 3.0 | 2.0 | 5.0 | 1700 | 3 | Black | 3.25 | 120 |
| 44 | 3.148 | 0.761 | 3.909 | 1650 | 3 | Black | 3.30 | 95 |
| 45 | 5.008 | 1.212 | 6.22 | 1650 | 3 | Black | 3.33 | 91 |
| 46 | 8.980 | 2.172 | 11.152 | 1650 | 3 | Black | 3.36 | 80 |
| 47 | 3.0 | 1.212 | 4.212 | 1650 | 3 | Black | 3.27 | 96 |
| 48 | 3.148 | 1.681 | 4.829 | 1650 | 3 | Black | 3.27 | 106 |
| 49 | 3.0 | 2.0 | 5.0 | 1650 | 3 | Black | 3.24 | 132 |
| 50 | 5.008 | 1.212 | 6.22 | 1600 | 3 | Black | 3.32 | 89 |
| 51 | 8.980 | 2.172 | 11.152 | 1600 | 3 | Black | 3.39 | 87 |
| 52 | 3.0 | 1.212 | 4.212 | 1600 | 3 | Black | 3.26 | 90 |
| 53 | 3.148 | 1.681 | 4.829 | 1600 | 3 | Black | 3.26 | 98 |
| 54 | 3.0 | 2.0 | 5.0 | 1600 | 3 | Black | 3.20 | 95 |
| 55 | 8.980 | 2.172 | 11.152 | 1550 | 3 | Black | 3.36 | 78 |
| 56 | 3.0 | 1.212 | 4.212 | 1550 | 3 | Black | 3.18 | 80 |
| 57 | 3.148 | 1.681 | 4.829 | 1550 | 3 | Black | 3.11 | 79 |

COMPARATIVE EXAMPLE 6

A comparative sintered body was prepared in the same way as Example 37 except that $CaCO_3$ powder was added in an amount of 1 wt. %, calculated as CaO, to the aluminum nitride powder used in Example 37 and sintering was conducted at 1800° C. for 3 hours. The sintered body thus obtained was gray and unevenly sintered portions were observed in the sintered body. Further, small pores were observed on the surface of the sintered body.

COMPARATIVE EXAMPLE 7

A comparative sintered body was prepared in the same way as Example 37 except that $WO_3$ powder was added in an amount of 3 wt. % to the aluminum nitride powder used in Example 37 and sintering was conducted at 1800° C. for 3 hours. The sintered body thus obtained was dark gray and uneven sintering and color were observed in some portions of the sintered body.

COMPARATIVE EXAMPLE 8

A comparative sintered body was prepared in the same way as Example 37 except that $CaCO_3$ powder was added in an amount of 1 wt. %, calculated as CaO, to the aluminum nitride powder used in Example 37. The sintered body thus obtained was light gray and was not so much densified.

COMPARATIVE EXAMPLE 9

A comparative sintered body was prepared in the same way as Example 37 except that $WO_3$ powder was added in an amount of 3 wt. % to the aluminum nitride powder used in Example 37. The sintered body thus obtained was poorly densified.

Density and thermal conductivity were measured for the sintered bodies of aluminum nitride obtained in Comparative Examples 6 to 9 as in the foregoing Examples and the results obtained are given in Table 5. It is apparent that those comparative sintered bodies all have a low thermal conductivity as compared to the sintered bodies of the present invention.

TABLE 5

| Comparative Ex. No. | Sintering aid | Amount wt. % | Sintering conditions Sintering temperature °C. | Sintering time Hr. |
|---|---|---|---|---|
| 6 | CaO | 1.0 | 1800 | 3 |
| 7 | $WO_3$ | 3.0 | 1800 | 3 |
| 8 | CaO | 1.0 | 1700 | 3 |
| 9 | $WO_3$ | 3.0 | 1700 | 3 |

| Comparative Ex. No. | Color | Density g/cc | Thermal conductivity W/m · K |
|---|---|---|---|
| 6 | Gray | 3.18 | 49 |
| 7 | Dark gray | 2.98 | 34 |
| 8 | Light gray | 2.91 | 37 |
| 9 | Gray | 2.42 | — |

EXAMPLES 58 TO 60

Further sintered bodies of aluminum nitride were obtained in the same manner as described in Example 37 except that molybdenum trioxide ($MoO_3$) powder and calcium carbonate ($CaCO_3$) were added in the amounts shown in Table 6 to the aluminum nitride powder used in Example 37.

Density and thermal conductivity were measured for the respective sintered bodies. The results obtained are shown in Table 6, together with the amounts of the used sintering aids, the sintering conditions and the color of the respective sintered bodies.

X-ray diffraction studies showed that all of the sintered bodies obtained in Examples 58 to 60 include, in addition to an AlN phase, calcium aluminate compound, metallic molybdenum and molybdenum compounds, as main constitutional phases. Further, it has been found that the black color of the sintered bodies was due to finely dispersed metallic molybdenum. The sintered body exhibited good electrical insulating properties (volume resistivity of at least $10^{13}$ ohm·cm)

EXAMPLE 61

A further sintered body of aluminum nitride was obtained in the same manner as described in Example 37 except that $MoO_3$ powder, $WO_3$, and $CaCO_3$ were added in the amounts shown in Table 6 to the aluminum nitride powder used in Example 37.

Density and thermal conductivity were measured for the sintered body. The results obtained are shown in Table 6, together with the amounts of the used sintering aids, the sintering conditions and the color of the sintered body.

TABLE 6

| Ex. No. | Sintering aid | | | | Sintering conditions | |
|---|---|---|---|---|---|---|
| | $MoO_3$ wt. % | $WO_3$ wt. % | CaO wt. % | Total amount wt. % | Sintering temperature °C. | Sintering time Hr. |
| 58 | 2.001 | — | 0.779 | 2.78 | 1700 | 3 |
| 59 | 3.231 | — | 1.259 | 4.49 | 1700 | 3 |
| 60 | 2.0 | — | 3.0 | 5.0 | 1700 | 3 |
| 61 | 2.0 | 1.0 | 2.0 | 5.0 | 1700 | 3 |

| Ex. No. | Color | Density g/cc | Thermal conductivity W/m · K |
|---|---|---|---|
| 58 | Black | 3.28 | 95 |
| 59 | Black | 3.29 | 87 |
| 60 | Black | 3.19 | 90 |
| 61 | Black | 3.23 | 98 |

As can be seen from Table 6, the results obtained were almost the same as those obtained in the cases where either one of $MoO_3$ or $WO_3$ was used with CaO.

As described above, the black sintered bodies of aluminum nitride in accordance with the present invention have high density, good thermal conductivity and superior light-shielding ability and can be produced at relatively low sintering temperatures. Due to such an advantageous combination of properties, the sintered bodies are especially useful as materials for insulating substrate, heat sink and packaging for semiconductor devices.

What is claimed is:

1. A black sintered body of aluminum nitride produced by adding a sintering aid to aluminum nitride to form a composition consisting essentially of said aluminum nitride and said sintering aid, said sintering aid being selected from the group consisting of (a) a mixture of (i) calcium oxide and (ii) at least one additional oxide selected from the group consisting of tungsten oxide and molybdenum oxide, (b) a composite oxide of calcium and at least one element selected from the group consisting of tungsten and molybdenum, and (c) a mixture of a calcium compound and at least one additional compound selected from the group consisting of tungsten compounds and molybdenum compounds, wherein said compounds are capable of being converted into said mixture (a) or said composite oxide (b) by sintering, the amount of said sintering aid, calculated as the oxides of Ca, W and Mo, being from 0.1 to 20 wt. %, based on the total weight of said composition, said sintering aid containing at least 0.02 wt. % of CaO, and one or both of at least 0.06 wt. % of $WO_3$ and at least 0.07 wt. % of $MoO_3$, based on the total weight of said composition, and then sintering said composition in a nonoxidizing atmosphere or in a vacuum.

2. A black sintered body of aluminum nitride as claimed in claim 1 in which the total amount of said sintering aid is from 1 to 15 wt. % calculated as the oxides of Ca, W and Mo, based on the total weight of said composition.

3. A black sintered body of aluminum nitride as claimed in claim 1 in which said sintering aid is at least one of calcium tungstate and calcium molybdate.

4. A black sintered body of aluminum nitride as claimed in claim 3 in which said calcium tungstate is $CaWO_4$ or $Ca_3WO_6$ and said calcium molybdate is $CaMoO_4$.

5. A black sintered body as claimed in claim 1 in which said sintering aid is selected from the group consisting of $CaWO_4$, $Ca_3WO_6$, $CaMoO_4$ and mixtures thereof.

6. A black sintered body as claimed in claim 1 in which said sintering aid is a mixture of a calcium compound selected from the group consisting of $CaO$, $CaCO_3$, $Ca(NO_3)_2 \cdot 4H_2O$ and $CaC_2O_4 \cdot H_2O$, and at least one additional compound selected from the group consisting of $WO_3$, $H_2WO_4$, $MoO_3$ and $H_2MoO_4$.

7. A black sintered body as claimed in claim 1, consisting essentially of aluminum nitride, calcium aluminate, finely dispersed metal selected from the group consisting of molybdenum metal, tungsten metal and both of said metals, and compounds formed by said sintering and selected from the group consisting of molybdenum compounds, tungsten compounds and both molybdenum compounds and tungsten compounds.

8. A black sintered body as claimed in claim 1 and having a thermal conductivity of at least 66 W/m.K.

9. A black sintered body as claimed in claim 8 and having a density of at least 3.07 g/cc.

10. A black sintered body of aluminum nitride produced by adding a sintering aid to aluminum nitride to form a composition consisting essentially of said aluminum nitride and said sintering aid, said sintering aid being selected from the group consisting of $CaWO_4$, $Ca_3WO_6$, $CaMoO_4$ and mixtures thereof, the amount of said sintering aid, calculated as the oxides of Ca, W and Mo, being from 0.1 to 20 wt. %, based on the total weight of said composition, and then sintering said composition in a nonoxidizing atmosphere or in a vacuum.

11. A black sintered body of aluminum nitride produced by adding a sintering aid to aluminum nitride to form a composition consisting essentially of said aluminum nitride and said sintering aid, said sintering aid consisting of a mixture of (i) $CaO$ and (ii) at least one additional oxide selected from the group consisting of $WO_3$ and $MoO_3$, the amount of said sintering aid, calculated as the oxides of Ca, W and Mo, being from 0.1 to 20 wt. %, based on the total weight of said composition, said sintering aid containing at least 0.02 wt. % of $CaO$, and one or both of at least 0.06 wt. % of $WO_3$ and 0.07 wt. % of $MoO_3$, based on the total weight of said composition, and then sintering said composition in a nonoxidizing atmosphere or in a vacuum.

* * * * *